(12) United States Patent
Yoshida et al.

(10) Patent No.: US 9,356,523 B2
(45) Date of Patent: May 31, 2016

(54) DC-TO-DC CONVERTER

(71) Applicant: Panasonic Intellectual Property Management Co., Ltd., Osaka (JP)

(72) Inventors: Koji Yoshida, Nara (JP); Satoshi Moriguchi, Kyoto (JP); Damri Radenamad, Singapore (SG); Laksamee Tippayawat, Bangkok (TH); Koji Akimasa, Nara (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 14/654,514

(22) PCT Filed: Sep. 26, 2013

(86) PCT No.: PCT/JP2013/005713
§ 371 (c)(1),
(2) Date: Jun. 20, 2015

(87) PCT Pub. No.: WO2014/103105
PCT Pub. Date: Jul. 3, 2014

(65) Prior Publication Data
US 2015/0333634 A1      Nov. 19, 2015

(30) Foreign Application Priority Data

Dec. 28, 2012   (JP) ................................. 2012-287097

(51) Int. Cl.
*H02M 3/335*      (2006.01)
*H02M 3/28*       (2006.01)
(Continued)

(52) U.S. Cl.
CPC ............ *H02M 3/33507* (2013.01); *H02M 3/28* (2013.01); *H02M 3/3353* (2013.01);
(Continued)

(58) Field of Classification Search
CPC ............ H02M 3/335; H02M 3/33507; H02M 3/33569; H02M 3/33576; H02M 2007/4815; Y02B 70/1416; Y02B 70/1433; Y02B 70/1466
USPC .................. 363/16, 17, 21.02, 21.03, 98, 132
See application file for complete search history.

(56) References Cited

U.S. PATENT DOCUMENTS 6,396,722 B2      5/2002  Lin
6,937,483 B2 *    8/2005  Zhu ................... H02M 3/33576
                                                        363/17

(Continued)

FOREIGN PATENT DOCUMENTS

EP      1227571       7/2002
EP      2461473       6/2012
(Continued)

OTHER PUBLICATIONS

The Extended European Search Report dated Dec. 9, 2015 for the related European Patent Application No. 13869546.5.
(Continued)

*Primary Examiner* — Gary L Laxton
(74) *Attorney, Agent, or Firm* — McDermott Will & Emery LLP

(57) ABSTRACT

A DC to DC converter includes: first and second switching elements connected at a first connection point between a first input/output terminal and a first ground terminal; third and fourth switching elements connected at a second connection point between the first input/output terminal and the first ground terminal; a resonant capacitor and a resonant inductor connected in series between the first and second connection points; fifth and sixth switching elements connected at a third connection point between a second input/output terminal and a second ground terminal; seventh and eighth switching elements connected at a fourth connection point between the second input/output terminal and the second ground terminal; a transformer; and a control circuit. The control circuit is operable to adjust the pulse waveforms for switching the fifth to eighth switching elements when voltage at the second input/output terminal is stepped down and output from the first input/output terminal.

14 Claims, 9 Drawing Sheets

(51) Int. Cl.
*H02M 3/337* (2006.01)
*H02M 7/5387* (2007.01)
*H02M 1/00* (2006.01)
*H02M 3/155* (2006.01)

(52) U.S. Cl.
CPC ........ *H02M3/3372* (2013.01); *H02M 3/33576* (2013.01); *H02M 3/33584* (2013.01); *H02M 2001/0058* (2013.01); *H02M 2003/1552* (2013.01); *Y02B 70/1433* (2013.01); *Y02B 70/1491* (2013.01)

(56) References Cited

U.S. PATENT DOCUMENTS

| | | | | |
|---|---|---|---|---|
| 7,843,708 | B2* | 11/2010 | Seong | H02M 3/3376 363/127 |
| 8,208,274 | B2* | 6/2012 | Raju | H02M 3/33561 363/132 |
| 8,811,039 | B2* | 8/2014 | The Ngo | H02M 3/33584 363/21.02 |
| 2004/0179381 | A1 | 9/2004 | Eguchi et al. | |
| 2009/0034299 | A1* | 2/2009 | Lev | H02M 3/33592 363/17 |

FOREIGN PATENT DOCUMENTS

| | | |
|---|---|---|
| JP | 2004-282828 | 10/2004 |
| JP | 2005-224012 | 8/2005 |
| JP | 2007-006653 | 1/2007 |
| WO | 2007/145388 | 12/2007 |

OTHER PUBLICATIONS

Krismer F et al: "A comparative evaluation of isolated bidirectional DC/DC converters with wide input and output voltage range", Conference Record of the 2005 IEEE Industry Applications Conference Fortieth IAS Annual Meeting Oct. 2-6, 2005 Kowloon, Hong Kong, China, IEEE, Conference Record of the 2005 IEEE Industry Applications Conference Fortieth IAS Annual Meeting IEEE Cal, vol. 1, Oct. 2, 2005, pp. 599-606.

Georg Pledl et al: "Theory of operation, design procedure and simulation of a bidirectional LLC resonant converter for vehicular applications", Vehicle Power and Propulsion Conference (VPPC), 2010 IEEE, IEEE, Sep. 1, 2010, pp. 1-5.

International Search Report of PCT application No. PCT/JP2013/005713 dated Dec. 10, 2013.

* cited by examiner

DC-TO-DC CONVERTER

This application is a U.S. national stage application of the PCT international application No. PCT/JP2013/005713 filed on Sep. 26, 2013, which claims the benefit of foreign priority of Japanese patent application No. 2012-287097 filed on Dec. 28, 2012, the contents all of which are incorporated herein by reference.

TECHNICAL FIELD

The present invention relates to a DC-to-DC converter capable of bi-directional voltage conversion.

BACKGROUND ART

A conventional bi-directional DC-to-DC converter for exchanging electric power between direct-current power supplies having different voltages is proposed in, for example, Patent Literature 1.

FIG. 9 is a circuit diagram of conventional DC-to-DC converter 500 disclosed in Patent Literature 1. DC-to-DC converter 500 is a bi-directional DC-to-DC converter for exchanging electric power between direct-current power supplies having different voltages. A direct-current power supply such as an automobile battery is connected to low-voltage-side terminals 101 and 103. Another direct-current power supply such as an automobile generator is connected to high-voltage-side terminals 105 and 107. Transformer 109 is connected between low-voltage-side terminals 101 and 103 and high-voltage-side terminals 105 and 107.

Low-voltage-side switch 111 is inserted between transformer 109 and low-voltage-side terminals 101 and 103. High-voltage-side switch 113 is inserted between transformer 109 and high-voltage-side terminals 105 and 107. Each of low-voltage-side switch 111 and high-voltage-side switch 113 includes a bridge circuit made up of four switching elements such as field-effect transistors (hereinafter, FETs).

LC resonant circuit 115 is inserted between a high-voltage-side winding of transformer 109 and high-voltage-side terminals 105 and 107.

Output smoothing capacitor 117 is connected between low-voltage-side terminals 101 and 103, and output smoothing capacitor 119 is connected between high-voltage-side terminals 105 and 107.

Next, an operation by bi-directional DC-to-DC converter 500 to supply electric power from low-voltage-side terminals 101 and 103 to high-voltage-side terminals 105 and 107 is described. Note that an operation to supply electric power in the opposite direction is similar to the operation described below.

Out of the four FETs in low-voltage-side switch 111, a pair of FETs on the upper left and the lower right and a pair of FETs on the upper right and the lower left are alternately turned ON and OFF, with the result that a positive voltage and a negative voltage are alternately applied to a low-voltage-side winding of transformer 109, inducing positive and negative square-wave voltages in the high-voltage-side winding of transformer 109. Since high-voltage-side switch 113 functions as a rectifying device, the positive and negative square-wave voltages are rectified by high-voltage-side switch 113. Electric power is output from high-voltage-side terminals 105 and 107 via LC resonant circuit 115. Current outputted from transformer 109 becomes a sine wave current by LC resonant circuit 115. With this, it is possible to set the timing of turning OFF the FETs to around a zero cross point at which the current value is approximately zero, meaning that switching of the FETs is possible at around the zero cross point of the current value so that switching loss upon exchanging electric power can be reduced.

CITATION LIST

Patent Literature

PTL 1: Unexamined Japanese Patent Publication No. 2004-282828

SUMMARY OF THE INVENTION

A DC-to-DC converter includes: first and second switching elements connected between a first input/output terminal and a first ground terminal, the first and second switching elements being connected in series to each other at a first connection point; third and fourth switching elements connected between the first input/output terminal and the first ground terminal, the third and fourth switching elements being connected in series to each other at a second connection point; a resonant capacitor and a resonant inductor connected in series to each other between the first and second connection points; fifth and sixth switching elements connected between a second input/output terminal and a second ground terminal, the fifth and sixth elements being connected in series to each other at a third connection point; seventh and eighth switching elements connected between the second input/output terminal and the second ground terminal, the seventh and eighth switching elements being connected in series to each other at a fourth connection point; a transformer; and a control circuit. The transformer has a primary winding and a secondary winding. The primary winding is connected in series to the resonant capacitor and the resonant inductor and is connected between the first and second connection points, and the secondary winding is connected in series between the third and fourth connection points. The control circuit is operable to adjust the pulse waveforms for switching the fifth, sixth, seventh, and eighth switching elements when voltage at the second input/output terminal is stepped down and output from the first input/output terminal.

This DC-to-DC converter is capable of bi-directional step-up and step-down operations.

DESCRIPTION OF EMBODIMENTS

First Embodiment

Figure 1:
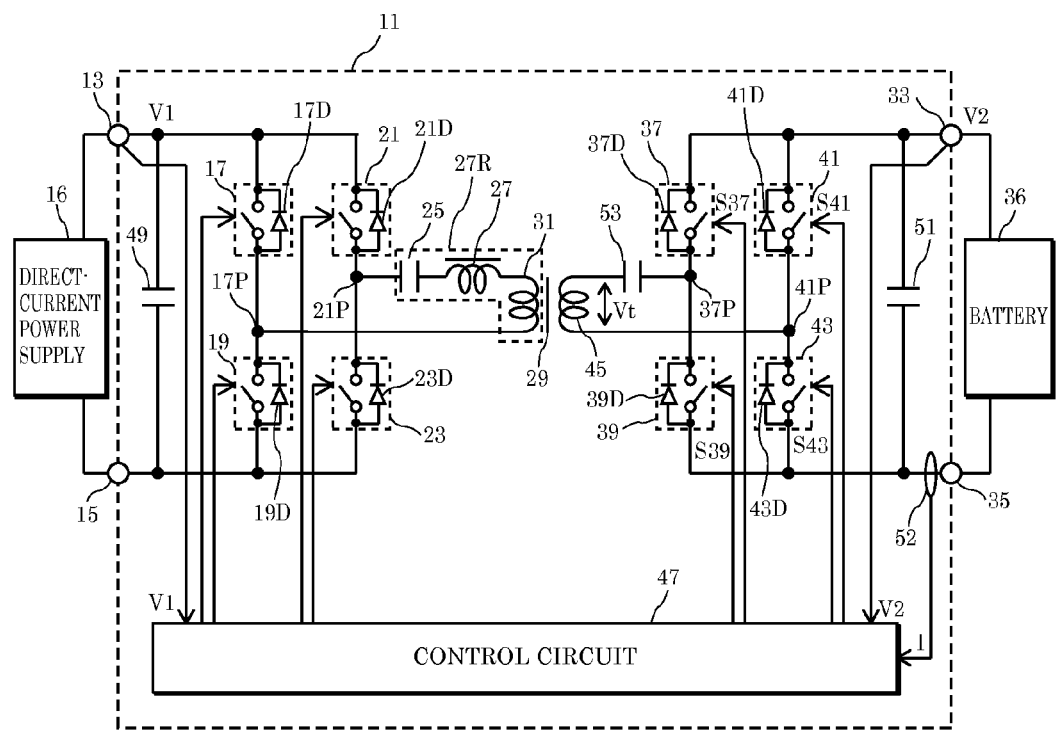
FIG. 1 is a circuit block diagram of a DC-to-DC converter according to a first embodiment of the present invention.

FIG. 1 is a circuit block diagram of DC-to-DC converter 11 according to a first embodiment of the present invention. DC-to-DC converter 11 includes switching elements 17 and 19 connected in series to each other at connection point 17P between input/output terminal 13 and ground terminal 15, switching elements 21 and 23 connected in series to each other at connection point 21P between input/output terminal 13 and ground terminal 15, and transformer 29. Transformer 29 has primary winding 31 and secondary winding 45. DC-to-DC converter 11 further includes, between connection points 17P and 21P, resonant capacitor 25 and resonant inductor 27 connected in series to primary winding 31 of transformer 29. DC-to-DC converter 11 further includes switching elements 37 and 39 connected in series to each other at connection point 37P between input/output terminal 33 and ground terminal 35, and switching elements 41 and 43 connected in series to each other at connection point 41P between input/output terminal 33 and ground terminal 35. In DC-to-DC converter 11, secondary winding 45 of transformer 29 is connected in series between connection points 37P and 41P. DC-to-DC converter 11 further includes control circuit 47 electrically connected to switching elements 17, 19, 21, 23, 37, 39, 41, and 43.

Control circuit 47 adjusts switching frequency f for switching switching elements 17, 19, 21, and 23 when voltage V1 at input/output terminal 13 is stepped up and output from input/output terminal 33. Control circuit 47 adjusts pulse waveforms for switching respective switching elements 37, 39, 41, and 43 when voltage V2 at input/output terminal 33 is stepped down and output from input/output terminal 13.

By switching the switching elements by adjusting the pulse waveforms upon a step-down operation, control circuit 47 can reduce voltage that is to be applied to transformer 29, so that voltage V2 at input/output terminal 33 can be stepped down and output from input/output terminal 13. Upon a step-up operation, control circuit 47 adjusts switching frequency f. By doing so, it is possible to provide bi-directional DC-to-DC converter 11 capable of both step-up and step-down operations.

Hereinafter, a structure and an operation of DC-to-DC converter 11 according to the first embodiment are described in more details.

Direct-current power supply 16 is connected to input/output terminal 13 and ground terminal 15 of DC-to-DC converter 11. In the first embodiment, direct-current power supply 16 outputs a direct-current voltage of 100 V. Direct-current power supply 16 functions also as a load that absorbs electric power. Smoothing capacitor 49 is electrically connected between input/output terminal 13 and ground terminal 15. Input/output terminal 13 is electrically connected to control circuit 47 for detecting voltage V1. Control circuit 47 includes a voltage detection circuit for detecting voltage V1 at input/output terminal 13 and outputting the detected voltage to a microcomputer embedded in control circuit 47.

Switching elements 17 and 19 are electrically connected to each other at connection point 17P between input/output terminal 13 and ground terminal 15. Switching elements 17 and 19 are each formed of a field-effect transistor (FET) and include parasitic diodes 17D and 19D, respectively, as illustrated in FIG. 1.

Likewise, switching elements 21 and 23 are connected in series to each other at connection point 21P between input/output terminal 13 and ground terminal 15. Switching elements 21 and 23 are also each formed of a FET and include parasitic diodes 21D and 23D, respectively.

Resonant capacitor 25, resonant inductor 27, and primary winding 31 of transformer 29 are connected in series between connection points 17P and 21P. Resonant capacitor 25, resonant inductor 27, and primary winding 31 connected in series form resonant circuit 27R having resonant frequency f0 which is set according to a capacitance value of resonant capacitor 25 and an inductance value of resonant inductor 27.

Battery 36 is connected as another direct-current power supply to input/output terminal 33 and ground terminal 35 of DC-to-DC converter 11. In the first embodiment, battery 36 is a battery for electric automobile that has a full charge voltage of DC 200 V. Smoothing capacitor 51 is electrically connected between input/output terminal 33 and ground terminal 35. Input/output terminal 33 is electrically connected to control circuit 47 for detecting voltage V2. Control circuit 47 includes a voltage detection circuit for detecting voltage V2 at input/output terminal 33 and outputting the detected voltage to a microcomputer embedded in control circuit 47.

Current sensor 52 for detecting current I flowing to the ground terminal is connected to ground terminal 35. Since current sensor 52 is electrically connected to control circuit 47, a detected current value (hereinafter, referred to as current I) which is a detected value of current outputted from current sensor 52 is retrieved by control circuit 47. Current I outputted from current sensor 52 is equivalent to a charging current for charging battery 36.

Switching elements 37 and 39 are connected in series to each other at connection point 37P between input/output terminal 33 and ground terminal 35. Switching elements 41 and 43 are connected in series to each other at connection point 41P between input/output terminal 33 and ground terminal 35. Switching elements 37, 39, 41, and 43 are also each formed of a FET and thus include parasitic diodes 37D, 39D, 41D and 43D, respectively.

Magnetic-bias control capacitor 53 and secondary winding 45 of transformer 29 are connected in series between connection points 37P and 41P. In the first embodiment, a turns ratio which is a ratio of the number of winding turns between primary winding 31 and secondary winding 45 of transformer 29 is one to one (1:1).

Control circuit 47 includes a microcomputer and a peripheral circuit. The peripheral circuit includes the above-described voltage detection circuit, a drive circuit that drives switching element 17, and a memory. Control circuit 47 controls switching of the switching elements to change a direction in which current flows and control voltage V1 at input/output terminal 13 and voltage V2 at input/output terminal 33.

Next, an operation of DC-to-DC converter 11 is described.

First, an operation to supply electric power from input/output terminal 13 and ground terminal 15 to input/output terminal 33 and ground terminal 35 is described. In this operation, DC-to-DC converter 11 steps up a direct-current voltage of 100 V of direct-current power supply 16 to fully charge battery 36 to a direct-current voltage of 200 V.

Control circuit 47 first turns OFF switching elements 37, 39, 41 and 43. By doing so, parasitic diodes 37D, 39D, 41D, and 43D form a bridge circuit, resulting in switching elements 37, 39, 41, and 43 functioning as a rectifier circuit.

Next, control circuit 47 performs switching control by turning switching elements 17, 19, 21, and 23 ON and OFF to step up voltage V1 (direct-current voltage of 100 V) at input/output terminal 13 and output resultant electric power from input/output terminal 33. A discharge completion voltage which is battery voltage Vb of battery 36 that has completed electric discharge is DC 100 V. Battery 36, the full charge voltage of which is DC 200 V, is connected to input/output terminal 33. Charging allows battery voltage Vb of battery 36 to change from DC 100 V up to DC 200 V.

Resonant frequency f0 of resonant circuit 27R including resonant capacitor 25, resonant inductor 27, and primary winding 31 is uniquely determined as mentioned above. A duty cycle of switching elements 17, 19, 21, and 23 is fixed at 50% with resonant frequency f0 when the switching elements are controlled at switching frequency f. The duty cycle is defined herein as a ratio of an ON duration of each switching element to a switching period. In DC-to-DC converter 11 according to the first embodiment, since the turns ratio of transformer 29 is 1:1, resonant capacitor 25, resonant inductor 27, and primary winding 31 of transformer 29 resonate, inducing in resonant capacitor 25 a resonant voltage according to switching frequency f. The resonant voltage increases as the difference between resonant frequency f0 and switching frequency f decreases; the resonant voltage decreases as the difference between resonant frequency f0 and switching frequency f increases. Voltage that is a sum of a switching waveform (square-wave) voltage and the resonant voltage is applied to primary winding 31 of transformer 29, and thus is induced in secondary winding 45 of transformer 29. The voltage induced in secondary winding 45 of transformer 29 is rectified and smoothed and thereafter is output as voltage V2 from input/output terminal 33. Therefore, it is possible to control voltage V2 by changing switching frequency f. Switching frequency f can be shifted to a frequency either higher or lower than resonant frequency f0 to change a step-up ratio.

In order that current is positive when the switching element is turned OFF (in order that current lags behind voltage in terms of phase), switching frequency f is set higher than resonant frequency f0. When switching frequency f is set high, the amplitude of the resonant voltage approaches zero, meaning that voltage having a switching waveform, i.e., a square-wave voltage, is applied to primary winding 31 of transformer 29. Voltage obtained by multiplying an input voltage by the turns ratio is induced in secondary winding 45 of transformer 29. The voltage induced in secondary winding 45 is rectified, resulting in output voltage V2. Therefore, output voltage V2 cannot be lower than or equal to voltage determined according to the input voltage and the turns ratio of transformer 29. In DC-to-DC converter 11 according to the first embodiment, a minimum output voltage is 100 V as the turns ratio of transformer 29 is 1:1 and the input voltage is 100 V. When switching frequency f is set low so that switching frequency f approaches resonant frequency f0, the amplitude of the resonant voltage increases, causing an increase in the output voltage. Therefore, the impedance of resonant circuit 27R is adjusted so that voltage V2 becomes 200 V even with a maximum load.

As described above, control circuit 47 adjusts switching frequency f for switching switching elements 17, 19, 21, and 23 so that switching frequency f is higher than or equal to resonant frequency f0 of resonant circuit 27R formed of resonant capacitor 25, resonant inductor 27, and primary winding 31. By doing so, a maximum step-up ratio is obtained when switching frequency f is a lower limit close to resonant frequency f0, and the step-up ratio can be adjusted to be lower (to 1 in the first embodiment) when switching frequency f is adjusted to be higher than resonant frequency f0.

A specific operation to charge battery 36 by DC-to-DC converter 11 is described below. At the start of charging battery 36, battery voltage Vb is the discharge completion voltage, that is, DC 100 V. At this time, if switching frequency f is set so that voltage V2 at input/output terminal 33 becomes the full charge voltage of DC 200V, an excess current flows to battery 36. Therefore, a charging operation involving constant current and constant voltage control is described.

First, control circuit 47 adjusts switching frequency f so that current I detected by current sensor 52 becomes predetermined current. As described above, the adjustment of switching frequency f results in the step-up ratio changing according to switching frequency f. Consequently, voltage V2 at input/output terminal 33 also changes, causing a change in current I which flows to battery 36. Thus, current I can be controlled so as to be a predetermined current through the adjustment of switching frequency f. The predetermined current is stored in a memory in advance, for example, as a maximum current for charging battery 36. Note that the predetermined current is not limited to the maximum current and may be lower than the maximum current, for example, with consideration of a margin for control error.

When battery 36 is charged with a constant current as described above, battery voltage Vb increases. Control circuit 47 reads voltage V2 at input/output terminal 33 and thereby can detect current battery voltage Vb. When battery voltage Vb becomes close to the full charge voltage, control circuit 47 switches constant current charging to constant voltage charging. Specifically, control circuit 47 switches the control that adjusts switching frequency f so that current I becomes the predetermined current to the control that adjusts switching frequency f so that voltage V2 at input/output terminal 33 becomes a predetermined voltage. This predetermined voltage is the full charge voltage of battery 36. When switching frequency f is controlled as described above, the step-up ratio changes accordingly, with the result that voltage V2 at input/output terminal 33 also changes. Switching frequency f is adjusted so that voltage V2 at input/output terminal 33 becomes the predetermined voltage. By repeating this operation, control circuit 47 adjusts switching frequency f and thereby can control voltage V2 at input/output terminal 33 so that voltage V2 at input/output terminal 33 becomes the predetermined voltage.

Thereafter, when battery voltage Vb reaches the full charge voltage, control circuit 47 ends charging of battery 36 by stopping switching switching elements 17, 19, 21, and 23.

Note that the above-described operation in which battery 36 is charged through the constant current and constant voltage control is not the only example. In the case where, instead of battery 36, a load that consumes electric power, for example, is connected between input/output terminal 33 and ground terminal 35, a certain voltage needs to be output to drive the load. In this case, control circuit 47 adjusts switching frequency f so as to perform constant voltage control from the beginning.

Next, an operation to step down voltage V2 at input/output terminal 33 in DC-to-DC converter 11 and output a resultant voltage from input/output terminal 13 is described. In this operation, battery voltage Vb of batter 36 that has been fully charged is stepped down, and resultant electric power is supplied to direct-current power supply 16 functioning as a load.

Through such a flow of electric power supply, DC-to-DC converter 11 steps down battery voltage Vb, which is reduced over time, to predetermined voltage V1 (DC 100 V) at input/output terminal 13, and stably outputs a resultant voltage.

Specifically, control circuit 47 first turns all switching elements 17, 19, 21, and 23 OFF. Thus, parasitic diodes 17D, 19D, 21D and 23D of these switching elements form a rectifier circuit.

Figure 2:
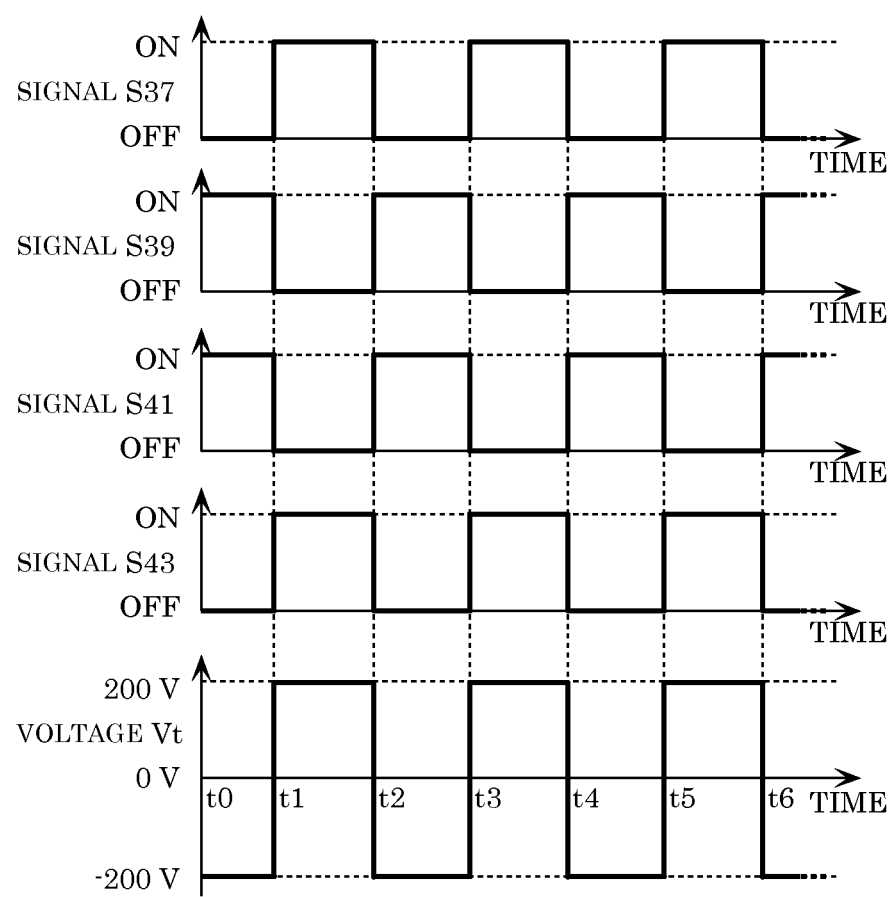
FIG. 2 illustrates waveforms of signals in the DC-to-DC converter according to the first embodiment.
Figure 3:
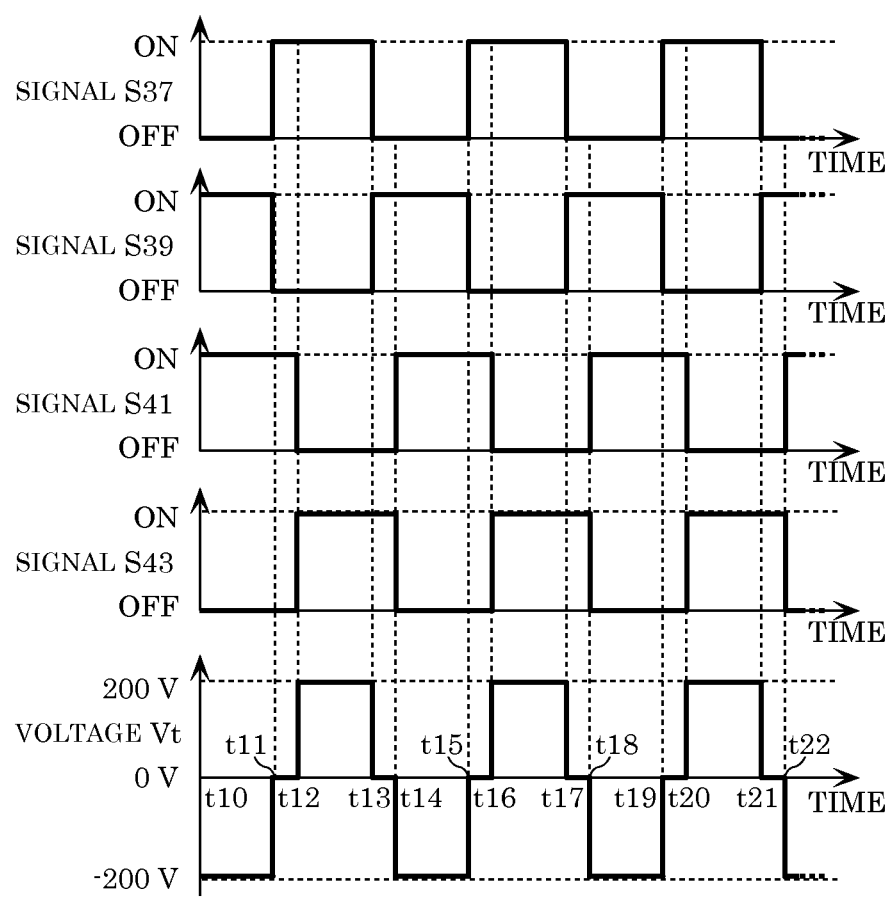
FIG. 3 illustrates waveforms of signals in the DC-to-DC converter according to the first embodiment.

Next, control circuit 47 steps down battery voltage Vb by adjusting pulse waveforms of signals for switching respective switching elements 37, 39, 41, and 43. At this time, control circuit 47 in the first embodiment adjusts pulse waveforms for switching by shifting switching phases of switching elements 41 and 43 from switching phases of switching elements 37 and 39. Details of the operation performed at this time are described. FIG. 2 and FIG. 3 illustrate waveforms of signals in DC-to-DC converter 11 according to the first embodiment. Specifically, FIG. 2 and FIG. 3 each illustrate a pulse waveform of signal S37 for switching switching element 37, a pulse waveform of signal S39 for switching switching element 39, a pulse waveform of signal S41 for switching switching element 41, a pulse waveform of signal S43 for switching switching element 43, and voltage Vt of secondary winding 45 of transformer 29. In FIG. 2 and FIG. 3, the horizontal axis represents time. Switching elements 37, 39, 41, and 43 are ON when signals S37, S39, S41, and S43 have an ON value; switching elements 37, 39, 41, and 43 are OFF when signals S37, S39, S41, and S43 have an OFF value. Signal S37 and signal S39 are complementary to each other, that is, signal S39 has an OFF value when signal S37 has an ON value, and signal S39 has an ON value when signal S37 has an OFF value. Signal S41 and signal S43 are complementary to each other, that is, signal S43 has an OFF value when signal S41 has an ON value, and signal S43 has an ON value when signal S41 has an OFF value. Signals S37, S39, S41, and S43 in FIG. 2 represent that switching phases of switching elements 37 and 39 match those of switching elements 41 and 43. Signals S37, S39, S41, and S43 in FIG. 3 represent that switching phases of switching elements 37 and 39 do not match switching phases of switching elements 41 and 43. In the first embodiment, the duty cycle of pulse waveforms is fixed at 50%.

As illustrated in FIG. 2, when the switching phases of switching elements 41 and 43 are not shifted from (i.e., match) the phases of switching elements 37 and 39, the pulse waveform of signal S37 of switching element 37 and the pulse waveform of signal S43 of switching element 43 are the same waveform, and the pulse waveform of signal S39 of switching element 39 and the pulse waveform of signal S41 of switching element 41 are the same waveform. Signal S37 of switching element 37 is in antiphase with signal S39 of switching element 39, and signal S41 of switching element 41 is in antiphase with signal S43 of switching element 43. When switching elements 37, 39, 41, and 43 are switched ON or OFF by signals S37, S39, S41, and S43, respectively, transformer voltage Vt is −200 V from time t0 to time t1 and 200 V from time t1 to time t2, after which transformer voltage Vt of 200 V and transformer voltage Vt of −200V are alternately induced in secondary winding 45 as illustrated in FIG. 2, as battery 36 is fully charged.

Since the turns ratio of transformer 29 is 1:1 as stated above, the same voltage as voltage Vt in FIG. 2 is induced in primary winding 31. The voltage induced in primary winding 31 is rectified by the rectifier circuit formed of parasitic diodes 17D, 19D, 21D, and 23D of switching elements 17, 19, 21, and 23, with the result that a voltage of substantially DC 200 V is generated at input/output terminal 13 and ground terminal 15 where influence such as a decrease in voltage due to internal resistance of the circuit system and the parasitic diodes is ignored. Thus, switching elements 17, 19, 21, and 23 are respectively switched ON or OFF according to the pulse waveforms of signal S37, S39, S41, and S43 illustrated in FIG. 2, with the result that a maximum value of battery voltage Vb, that is, 200 V, is output from input/output terminal 13. In the case as described above where the switching phases of switching elements 41 and 43 are not shifted from the switching phases of switching elements 37 and 39, a ratio of voltage V1 to voltage V2, i.e., a step-down ratio, is 1.

Next, a description is given of an operation of DC-to-DC converter 11 in which the switching phases of switching elements 41 and 43 are shifted from the switching phases of switching elements 37 and 39 as illustrated in FIG. 3. In the operation illustrated in FIG. 3, signals S37 and S39 are out of phase with signals S41 and S43 in such a way that pulse waveforms of signals S41 and S43 lag behind pulse waveforms of signal S37 and S39. All signals S37, S39, S41, and S43 have an OFF value from time t10 to time t11. Signals S37 and S41 have an ON value and signals S39 and S43 have an OFF value from time t11 to time t12. In this state, in the bridge circuit formed of four switching elements 37, 39, 41, and 43, the switching elements in an upper arm connected to input/output terminal 33 (switching elements 37 and 41) are ON, and the switching elements in a lower arm connected to ground terminal 35 (switching elements 39 and 43) are OFF, resulting in voltage Vt of secondary winding 45 being 0 V. In the period from time t15 to time t16 and the period from time t19 to time t20, switching elements 37, 39, 41, and 43 operate in the same manner as the above-described operation in the period from time t11 to time t12.

In the period from time t13 to time t14, the ON state and the OFF state are opposite to those described above, that is, switching elements 37 and 41 in the upper arm are OFF, and switching elements 39 and 43 in the lower arm are ON. Therefore, voltage V2 at input/output terminal 33 is not applied to secondary winding 45, with the result that transformer voltage Vt is 0 V. In the period from time t17 to time t18 and the period from time t21 to time t22, switching elements 37, 39, 41, and 43 operate in the same manner as the above-described operation in the period from time t13 to time t14.

In other periods than the above period, switching elements 37, 39, 41, and 43 operate in the same manner as the operation illustrated in FIG. 2, resulting in voltage Vt of secondary winding alternating between −200 V and 200 V. With the above-described operation, voltage Vt in FIG. 3 is applied to secondary winding 45.

When the pulse waveforms thus have a phase shift, there is a period in which transformer voltage Vt is 0 V. The same voltage as voltage Vt is induced in primary winding 31. The voltage induced in primary winding 31 is rectified by parasitic diodes 17D, 19D, 21D, and 23D via resonant circuit 27R and smoothed by smoothing capacitor 49, resulting in voltage V1 at input/output terminal 13 being lower than 200 V according to an amount of the phase shift.

The above operation makes it possible that in DC-to-DC converter 11, voltage V2 at input/output terminal 33 is stepped down and output from input/output terminal 13.

Next, a specific operation of DC-to-DC converter 11 for supplying electric power of battery 36 to direct-current power supply 16 functioning as a load is described.

First, with the pulse waveforms illustrated in FIG. 2 that have no phase shift, substantially the same voltage as battery voltage Vb can be output from input/output terminal 13. Being substantially the same herein means, by definition, being the same within a range of voltage variations caused by the above-described decrease in voltage due to internal resistance of the circuit system and the parasitic diodes. Note that the decrease in voltage due to internal resistance of the circuit system and the parasitic diodes is around two digit less than the voltage in the first embodiment that ranges from DC 100 V to 200 V.

As illustrated in FIG. 3, the length of the period in which transformer voltage Vt is 0 V increases, resulting in voltage V1 at input/output terminal 13 being reduced, as the phase shift increases. With a phase shift of 180 degrees, transformer voltage Vt is nearly 0 V, resulting in voltage V1 at input/output terminal 13 also being 0 V. Thus, a maximum adjustment range for shifting a phase ranges from 0 degrees to 180 degrees.

When battery voltage Vb is changing from DC 200 V to DC 100 V during discharging of battery 36, DC-to-DC converter 11 in the first embodiment stabilizes, at DC 100 V, voltage V1 at input/output terminal 13 which is obtained by stepping down battery voltage Vb. Control circuit 47 first steps down, to DC 100 V, battery voltage Vb (=DC 200 V) of battery 36 fully charged, and outputs a resultant voltage from input/output terminal 13. Specifically, in order to obtain a step-down ratio of ½, the switching phases of switching elements 41 and 43 are shifted from the switching phases of switching elements 37 and 39. As a result, it is possible to change voltage V1 at input/output terminal 13 to DC 100 V by adjusting a ratio of a period in which transformer voltage Vt is 0 V to a total of periods in which transformer voltage Vt is −200 V or 200 V within a single switching factor.

After the start of electric power supply to direct-current power supply 16 connected to input/output terminal 13, battery voltage Vb is reduced over time during discharging. As a result, when switching of switching elements 37, 39, 41, and 43 continues with a constant phase, the step-down ratio is fixed at ½, meaning that voltage V1 at input/output terminal 13 is reduced as battery voltage Vb is reduced.

In order to stabilize voltage V1 at input/output terminal 13, control circuit 47 detects voltage V1 at input/output terminal 13 and adjusts a phase shift so that voltage V1 becomes a predetermined voltage (that is DC 100 V in this case). Specifically, in the adjustment, control circuit 47 reduces the phase shift according to voltage V1 at input/output terminal 13 so as to increase the step-down ratio to larger than ½. This operation is under feedback control, that is, control circuit 47 adjusts the phase shift immediately upon a change in voltage V1 at input/output terminal 13. By repeating this operation, DC-to-DC converter 11 can stabilize voltage V1 at input/output terminal 13 while stepping down battery voltage Vb even when battery voltage Vb is reduced.

As a result of this operation, control circuit 47 performs switching with almost no phase shift, that is, with the signals illustrated in FIG. 2, when battery voltage Vb becomes close to the discharge completion voltage of DC 100 V. At this time, since the step-down ratio is around 1 as described above, voltage V1 that is substantially the same as battery voltage Vb is output from input/output terminal 13. Control circuit 47 detects voltage V2 at input/output terminal 33, that is, battery voltage Vb, and when a value thus detected is not less than the discharge completion voltage, stops switching switching elements 37, 39, 41, and 43. Consequently, electric power supply to direct-current power supply 16 functioning as a load stops, and battery 36 is protected from being over-discharged.

Note that given that adjustment of switching frequency f causes voltage to be stepped up, which cancels out the above step-down effect, switching frequency f is fixed during a step-down operation. Switching frequency f may be substantially equal to or higher or lower than resonant frequency f0 of resonant circuit 27R formed of resonant capacitor 25, resonant inductor 27, and primary winding 31. However, it is not preferred to set switching frequency f to a value substantially equal to resonant frequency f0 because, with such setting, the step-up ratio is maximized as described above, maximizing the cancel effect on the step-down operation, and moreover, if the phase shift is small, there is a risk that a maximum voltage at input/output terminal 33 (that is the full charge voltage of battery 36 in this case) will be unexpectedly generated at input/output terminal 13. When switching frequency f is set lower than resonant frequency f0, loss is great. Therefore, it is preferable to set switching frequency f higher than resonant frequency f0.

As described, switching frequency f of switching elements 37, 39, 41, and 43 is set higher than resonant frequency f0 of resonant circuit 27R formed of resonant capacitor 25, resonant inductor 27, and primary winding 31. This allows DC-to-DC converter 11 to step down voltage with small loss and a reduced step-up effect.

With the above structure and operation, control circuit 47 can adjust pulse waveforms by shifting a switching phase upon a step-down operation to switch switching elements 37, 39, 41, and 43 so that voltage that is to be applied to transformer 29 is lowered. Thus, voltage V2 at input/output terminal 33 can be stepped down and output from input/output terminal 13. Upon a step-up operation, control circuit 47 adjusts switching frequency f. By doing so, it is possible to provide bi-directional DC-to-DC converter 11 capable of both step-up and step-down operations.

Note that the duty cycle of pulse waveforms is fixed at 50% in the first embodiment, but is not limited to this example and may be set to a value other than 50% within a range such that a required step-down ratio can be obtained. In such a case, an effect equivalent to that in the first embodiment can be obtained.

Figure 9:
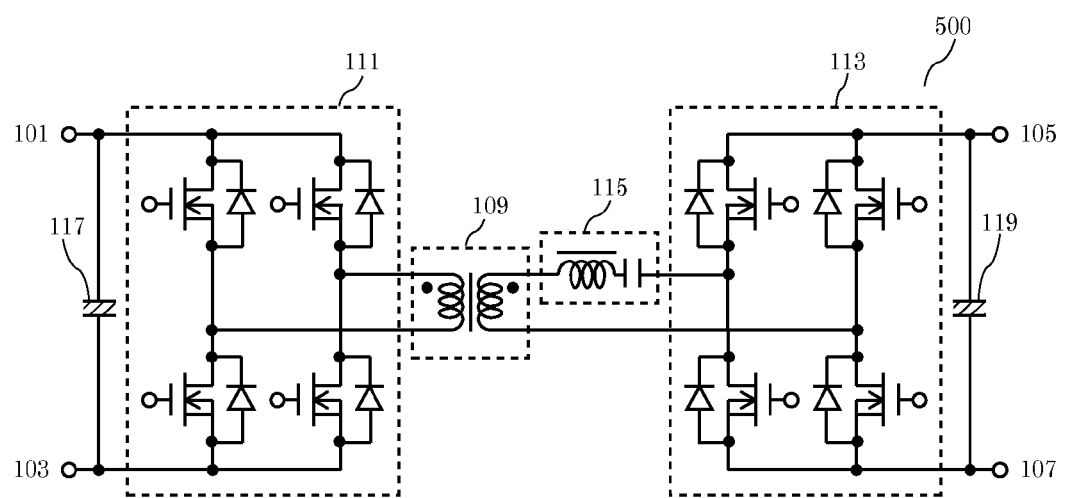
FIG. 9 is a circuit diagram of a conventional bi-directional DC-to-DC converter.

In conventional DC-to-DC converter 500 illustrated in FIG. 9, the above operation makes it possible to supply electric power to each other between a direct-current power supply connected to low-voltage-side terminals 101 and 103 and a direct-current power supply connected to high-voltage-side terminals 105 and 107 when voltage between low-voltage-side terminals 101 and 103 and voltage between high-voltage-side terminals 105 and 107 are relatively stable.

Next, a description is given of an operation of DC-to-DC converter 500 performed when voltage of the battery varies depending on a state of charge and a charging or discharging operation. A current resonant converter represented by DC-to-DC converter 500 including LC resonant circuit 115 is driven at a frequency higher than a resonant frequency of LC resonant circuit 115. LC resonant circuit 115 is provided on the input side of the transformer and adjusts a switching frequency to change a resonant voltage, thereby adjusting an output voltage. As the switching frequency is reduced and becomes close to the resonant frequency, the amplitude of the resonant voltage of the LC resonant circuit increases, meaning that an increased voltage is obtained from the output of the transformer. As the switching frequency increases, the amplitude of the resonant voltage is reduced, and when the amplitude of the resonant voltage is close to zero, there is almost no decrease in output voltage, meaning that it is hard to control the output voltage to below a certain value. Therefore, the turns ratio of the transformer is adjusted so that an output voltage having a lower limit value is output at a maximum frequency, and the current resonant converter is controlled to reduce the switching frequency, thereby increasing the resonant voltage, that is, increasing the output voltage, so that an output voltage having an upper limit value is output.

A description is given to an operation of DC-to-DC converter 500 performed, for example, to vary an output voltage at low-voltage-side terminals 101 and 103 within a range of 100 V to 200 V when an input voltage of 100 V is input to high-voltage-side terminal 105 and 107 to charge a battery connected to low-voltage-side terminals 101 and 103 with reference to FIG. 9. When the switching frequency is high, the turns ratio of the transformer can be adjusted to about 1:1 so that an output voltage of 100 V, which is substantially equal to the input voltage of 100 V, is generated. In order to obtain an output voltage of 200 V, the switching frequency can be adjusted to become closer to the resonant frequency so that the input voltage is stepped up to generate the output voltage.

Next, discharging the battery is described. A voltage of the battery is gradually reduced from a full charge voltage (DC 200 V) to a discharge completion voltage (e.g., DC 100 V) as described above. Therefore, DC-to-DC converter 500 needs to convert such a significantly changing voltage into a stable voltage of DC 100 V before outputting the voltage. In this case, LC resonant circuit 115 can be inserted between transformer 109 and an input side of transformer 109, that is, low-voltage-side switch 111, to control the switching frequency so that the resonant voltage becomes variable, and thus it is possible to adjust the output voltage.

However, DC-to-DC converter 500, which is capable of changing the step-up ratio according to a difference between the switching frequency and the resonant frequency as described above, is incapable of stepping down a voltage because there is a minimum controllable voltage. Since the turns ratio of transformer 109 is set to about 1:1 so that the input voltage and the output voltage are equal, it is possible to generate a 100 V or higher output voltage when the voltage of the battery is 100 V. However, if voltage of 200 V is input from the battery, a 200 V or higher output voltage is generated, meaning that it is difficult to control the switching frequency so as to reduce the output voltage to below 200 V.

From the foregoing, bi-directional voltage conversion and output are difficult in conventional DC-to-DC converter 500 when a variable range of voltage is wide.

DC-to-DC converter 11 in the first embodiment is capable of both step-up and step-down operations as described above.

Second Embodiment

Figure 4:
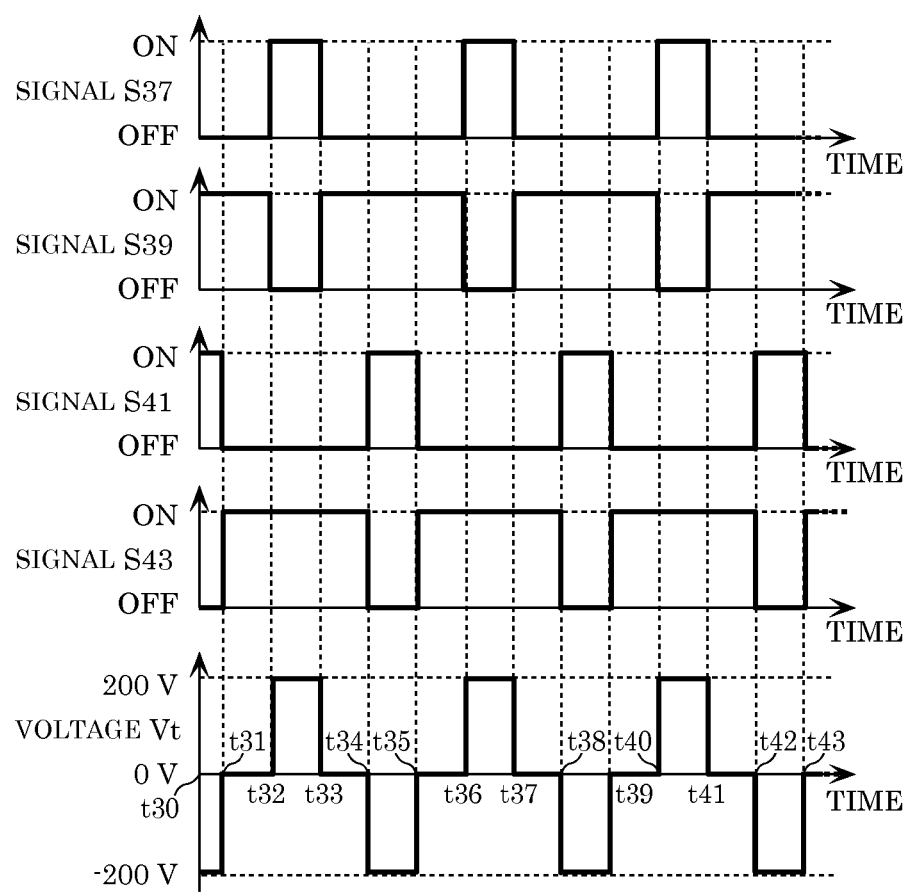
FIG. 4 illustrates waveforms of signals in the DC-to-DC converter according to a second embodiment of the present invention.

FIG. 4 illustrates signals S37, S39, S41, and S43 of DC-to-DC converter 11 according to a second embodiment of the present invention. Portions in FIG. 4 that are the same as those of DC-to-DC converter 11 according to the first embodiment illustrated in FIG. 1 to FIG. 3 are denoted by the same reference numerals. In DC-to-DC converter 11 according to the second embodiment, signals S37, S39, S41, and S43 of switching elements 37, 39, 41, and 43 have a variable duty cycle.

In DC-to-DC converter 11 according to the second embodiment, control circuit 47 adjusts the pulse waveforms by adjusting the duty cycle with the switching phases of switching elements 41 and 43 shifted 180 degrees from the switching phases of switching elements 37 and 39.

Upon a step-down operation, control circuit 47 adjusts the duty cycle to adjust the pulse waveforms of signals S37, S39, S41, and S43 for switching respective switching elements 37, 39, 41, and 43. This makes it possible that voltage to be applied to transformer 29 is reduced because the period in which transformer voltage Vt is 0 V can be controlled according to the duty cycle. Thus, voltage V2 at input/output terminal 33 can be stepped down and output from input/output terminal 13. Upon a step-up operation, control circuit 47 adjusts switching frequency f. By doing so, it is possible to provide bi-directional DC-to-DC converter 11 capable of both step-up and step-down operations.

Next, details of an operation of DC-to-DC converter 11 according to the second embodiment are described.

First, a step-up operation is performed by adjusting switching frequency f as in the first embodiment.

Next, a step-down operation is described. Control circuit 47 shifts the switching phases of switching elements 41 and 43 by 180 degrees from the switching phases of switching elements 37 and 39. In this state, the duty cycle is set to 50%, with the result that either both of switching elements 37 and 41 in the upper arm or both of switching elements 39 and 43 in the lower arm is OFF and therefore, voltage Vt of transformer 29 becomes 0 V as in the first embodiment.

Next, when control circuit 47 controls the duty cycle so that the duty cycle becomes less than 50%, pulse waveforms of signals S37 and S41 for switching elements 37 and 41 that have a short ON period are generated as illustrated in FIG. 4. As illustrated in FIG. 4, signals S39 and S43 for switching elements 39 and 43 are respectively in antiphase with signals S37 and S41 for switching elements 37 and 41 and therefore, switching elements 39 and 43 have a long ON period. This results in a period in which voltage Vt of transformer 29 is 200 V, a period in which voltage Vt is 0 V, and a period in which voltage Vt is −200 V as illustrated in FIG. 4. When voltage Vt illustrated in FIG. 4 is rectified by four parasitic diodes 17D, 19D, 21D, and 23D of switching elements 17, 19, 21, and 23, a direct-current voltage that is higher than 0 V and lower than 200 V according to the duty cycle is generated in input/output terminal 13. With this, the full charge voltage of battery 36, i.e., voltage of 200 V, can be stepped down and output from input/output terminal 13.

Specifically, since control circuit 47 detects voltage V1 at input/output terminal 13, control circuit 47 performs feedback control on the duty cycle so that voltage V1 becomes a predetermined voltage. The predetermined voltage is voltage to be input to an inverter for generating AC 100 V required by direct-current power supply 16 functioning as a load, and is DC 100 V, for example. The above control is performed using the pulse waveforms of signals S37, S39, S41, and S43 illustrated in FIG. 4. In detail, with the pulse waveforms of signals S37 and S41 illustrated in FIG. 4, transformer voltage Vt illustrated in FIG. 4 is 200 V at maximum and −200 V at minimum when battery 36 is fully charged. In half a factor, the period in which voltage Vt is 200 V and the period in which voltage Vt is 0V are adjusted, and the period in which voltage Vt is −200 V and the period in which voltage Vt is 0V are adjusted so that a direct-current voltage obtained by rectifying voltage induced in primary winding 31 can be controlled within a range of 0 V to 200 V, that is, the direct-current voltage can be adjusted to 100 V because the turns ratio of transformer 29 is 1:1. Thus, the pulse waveforms of signals S37, S39, S41, and S43 illustrated in FIG. 4 can be used to step down battery voltage Vb in a fully charged state (200 V) so that a direct-current voltage of 100 V is output from input/output terminal 13.

Upon a step-down operation, battery 36 is discharged, and therefore battery voltage Vb is reduced over time. According to a reduction in battery voltage Vb, control circuit 47 performs feedback control so as to increase the duty cycle of signals S37 and S41 and thereby can stabilize voltage V1 at input/output terminal 13.

When input/output terminal voltage V2 is reduced to around DC 100 V, control circuit 47 adjusts the duty cycle so that the duty cycle becomes close to 50% in order to output a predetermined voltage (DC 100 V) from input/output terminal 13. In this case, since control circuit 47 detects battery voltage Vb as voltage V2 at input/output terminal 33, when voltage V2 at input/output terminal 33 reaches about a discharge completion voltage of battery 36 (DC 100 V), control circuit 47 stops the operation for switching switching elements 37, 39, 41, and 43 to stop the step-down operation.

With the operation as described above, DC-to-DC converter 11 according to the second embodiment allows voltage V2 at input/output terminal 33 to be stepped down and output from input/output terminal 13.

When the duty cycle of signals S37 and S39 is set to a value greater than 50%, a rectified voltage results in, at input/output terminal 13, a direct-current voltage higher than 0 V and lower than 200 V according to the duty cycle as in the case where the duty cycle is set to a value less than 50%, though voltage Vt is in antiphase with that illustrated in FIG. 4. Therefore, the duty cycle may be set to a value greater or less than 50%. When the duty cycle is set to a value greater than 50% under the voltage condition in the second embodiment, that is, where voltage V1 at input/output terminal 13 is stabilized to DC 100 V and voltage V2 at input/output terminal 33 is reduced from DC 200 V to DC 100 V, the duty cycle is first controlled so as to fall within a range of 50% to 100% and is then reduced as battery voltage Vb is reduced, and when battery voltage Vb becomes close to a discharge completion voltage (DC 100 V), the duty cycle is controlled so as to be close to 50%.

In DC-to-DC converter 11 in the second embodiment, switching frequency f is fixed during a step-down operation, and switching frequency f is set greater than resonant frequency f0, as in the first embodiment.

With the above structure and operation, control circuit 47 adjusts the duty cycle upon a step-down operation to adjust the pulse waveforms of signals for switching respective switching elements 37, 39, 41, and 43 and thereby can control the period in which transformer voltage Vt is 0 V according to the duty cycle, and thus it is possible to reduce voltage that is to be induced in transformer 29. Thus, voltage V2 at input/output terminal 33 can be stepped down and output from input/output terminal 13. Upon a step-up operation, control circuit 47 adjusts switching frequency f. By doing so, it is possible to provide bi-directional DC-to-DC converter 11 capable of both step-up and step-down operations.

Third Embodiment

Figure 5:
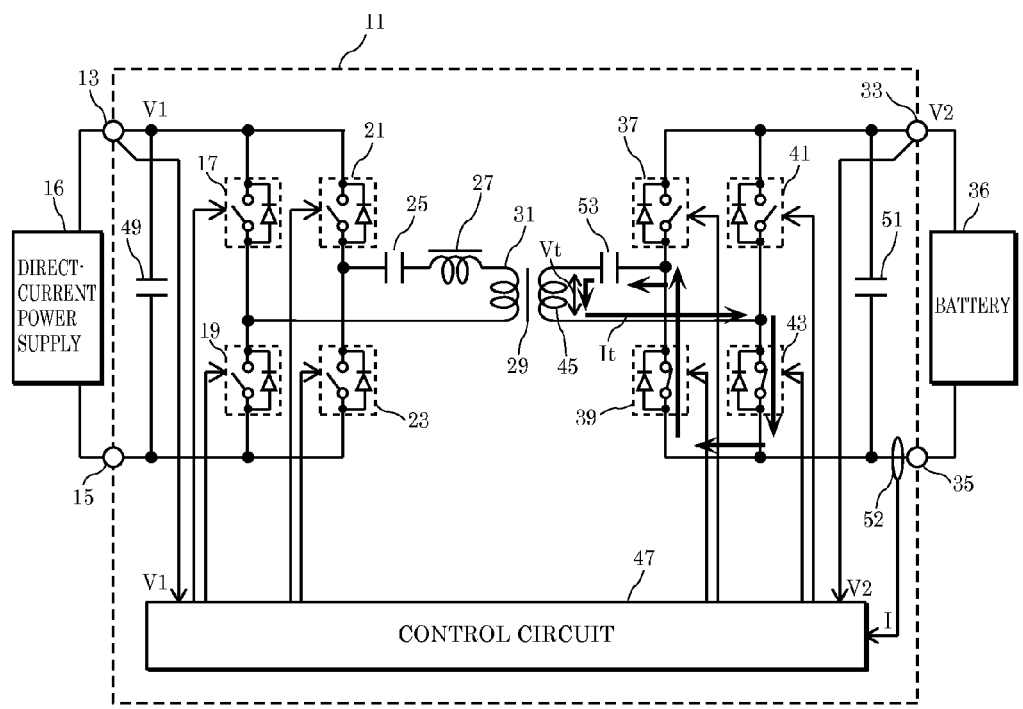
FIG. 5 is a circuit block diagram of a DC-to-DC converter according to a third embodiment of the present invention.

FIG. 5 is a circuit block diagram of DC-to-DC converter 11 according to a third embodiment of the present invention. In FIG. 5, transformer current It is shown which flows through secondary winding 45 of transformer 29 where voltage Vt of secondary winding 45 of transformer 29 is 0 V when voltage V2 at input/output terminal 33 is stepped down and output from input/output terminal 13.

In DC-to-DC converter 11 according to the third embodiment, when voltage V2 at input/output terminal 33 is stepped down and output from input/output terminal 13, preset switching frequency fs at which the duty cycle is closest to 50% where a maximum load current flows to input/output terminal 13 is predetermined and stored in correlation with voltage V2 at input/output terminal 33, and control circuit 47 sets switching frequency for switching switching elements 37, 39, 41, and 43 to preset switching frequency fs according to input/output terminal voltage V2.

With this, there is a reduced risk of transformer current It which flows through secondary winding 45 of transformer 29 being negative even when the maximum load current flows to input/output terminal 13, meaning that it is no longer necessary to increase transformer current It or perform other control so that transformer current It will not be negative. As a result, a reactive current that is generated to increase transformer current It is no longer necessary, and the efficiency can be improved. By doing so, it is possible to provide bi-directional DC-to-DC converter 11 capable of both step-up and step-down operations with high efficiency.

Next, a detailed operation of DC-to-DC converter 11 according to the third embodiment is described.

First, a step-up operation is performed by adjusting switching frequency f as in the first embodiment.

Figure 6:
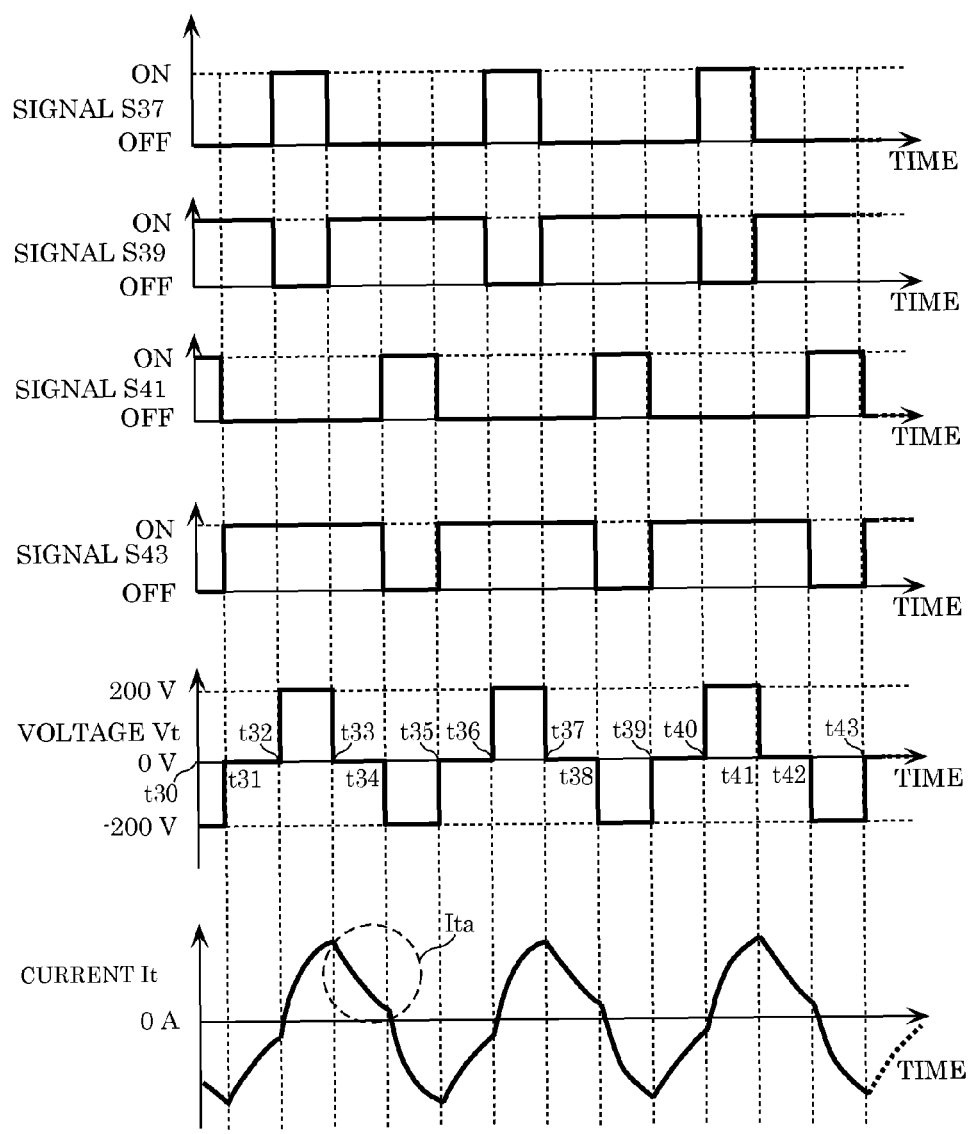
FIG. 6 illustrates waveforms of signals in the DC-to-DC converter according to the third embodiment.

Next, a step-down operation is described. FIG. 6 shows waveforms of signals S37, S39, S41, and S43 for switching respective switching elements 37, 39, 41, and 43 of DC-to-DC converter 11 according to the third embodiment, transformer voltage Vt of secondary winding 45 of transformer 29, and transformer current It which flows through secondary winding 45. In FIG. 6, a duty cycle which is a ratio of the length of time for which switching elements 37 and 41 are ON to one period is 25%.

When voltage of battery 36 is stepped down and resultant electric power is output to direct-current power supply 16, that is, when voltage V2 of input/output terminal 33 is stepped down and output from input/output terminal 13, control circuit 47 operates to adjust the pulse waveforms of signals S37, S39, S41, and S43 for switching respective switching elements 37, 39, 41, and 43 as in the first embodiment. FIG. 6 illustrates the pulse waveforms of signals S37, S39, S41, and S43 for switching operations performed, for example, when the duty cycle is 25%. The duty cycle is a ratio of an ON duration to one switching period. Upon a step-down operation, a pair of switching elements 37 and 43 and a pair of switching elements 39 and 41 are alternately switched ON and OFF, resulting in the duty cycle being within a range of 0% to 50%.

First, a step-down operation of DC-to-DC converter 11 according to the third embodiment is described below.

As illustrated in FIG. 6, when the duty cycle is 25%, transformer voltage Vt repeatedly switches to values within in a range of −200 V to +200 V around 0 V as in FIG. 4.

In this case, one switching period from time t31 to t35 includes a simultaneous ON period in which switching elements 39 and 43 in the lower arm are simultaneously ON. The simultaneous ON period is a period from time t31 to t32 and a period from time t33 to time t34. The simultaneous ON period is 50% of one switching period as illustrated in FIG. 6. In these periods, transformer current It flows from secondary winding 45 of transformer 29 to switching elements 43 and 39 and then magnetic-bias control capacitor 53 as illustrated in FIG. 5.

Changes in transformer current It over time are shown in FIG. 6. Transformer current It non-linearly changes according to a time constant of a circuit formed of secondary winding 45 and magnetic-bias control capacitor 53. The time constant is determined based on inductance of secondary winding 45 and a capacitance value of magnetic-bias control capacitor 53. For example, in the period from time t33 to time t34, the change in transformer current It is non-linear reduction according to the time constant determined based on inductance of secondary winding 45 and a capacitance value of magnetic-bias control capacitor 53.

When voltage V2 at input/output terminal 33 is close to voltage V1 at input/output terminal 13, a switching duty cycle of switching elements 37, 39, 41, and 43 is great, with the result that the simultaneous ON period in which switching elements 39 and 43 are simultaneously ON (the period from time t33 to time t34) is short. Therefore, the risk of transformer current It illustrated in FIG. 6 becoming negative in the simultaneous ON period is low. This shows that as the duty cycle increases, that is, as the length of the simultaneous ON period is reduced, the risk of transformer current It becoming negative and flowing back is reduced.

When voltage V2 at input/output terminal 33 is greater than voltage V1 at input/output terminal 13, that is, for example, when voltage V2 at input/output terminal 33 is +200 V with battery 36 fully charged and voltage V1 at input/output terminal 13 needs to be +50 V, the difference between voltages V1 and V2 is great, and therefore control circuit 47 adjusts the pulse waveforms so that the duty cycle is reduced. As a result, the simultaneous ON period (that is the period from time t33 to time t34 in FIG. 6, for example) becomes long. This increases the risk of transformer current Ita at time t34 becoming negative and causing a backflow of transformer current It.

When the backflow of transformer current It occurs, a direction of current flowing through switching element 43 becomes opposite, and therefore parasitic diode 43D of switching element 43 is turned ON. In this state, control circuit 47 controls switching elements 41 and 43 so that at time t34, switching elements 41 is turned ON and switching element 43 is turned OFF. However, even when switching element 43 is turned OFF under control, parasitic diode 43D has a recovery period from ON to OFF, meaning that parasitic diode 43D remains ON during the recovery period. Thus, there is a state where switching element 41 is ON and parasitic diode 43D of switching element 43 is ON, resulting in a short circuit between input/output terminal 33 and ground terminal 35. As a result, current flows in from battery 36 in a direction opposite to transformer current It while transformer current It flows back, and therefore loss occurs rapidly. As described above, in an operation of DC-to-DC converter 11 according to the second embodiment, there is a case where large loss occurs when voltage V2 at input/output terminal 33 is greater than voltage V1 at input/output terminal 13 and a difference between these voltages is large.

In order to avoid such loss, transformer current It is set high, for example, so that the risk of transformer current It becoming negative before time t34 can be reduced. However, the increased part of transformer current It becomes a reactive current, which is loss, meaning that this approach is not sufficient for loss reduction.

In DC-to-DC converter according to the third embodiment, control circuit 47 performs the following control in order to eliminate the above loss.

First, a value of switching frequency f at which the duty cycle is closest to 50% when the maximum load current flows to input/output terminal 13 is predetermined in relation to voltage V2 at input/output terminal 33, and control circuit 47 stores, as a map, a relationship of correlation between voltage V2 at input/output terminal 33 and preset switching frequency fs. Specifically, this map is determined as follows. First, a value of input/output terminal voltage V2 is set. Next, the duty cycle is adjusted so that when input/output terminal voltage V2 has the above value, a load current that is output from input/output terminal 13 becomes maximum. In this case, when the duty cycle is set too small, the risk of transformer current It becoming negative becomes high as described above, and therefore an adjustment is made to increase switching frequency f. The duty cycle is adjusted again so that the load current becomes maximum at resultant switching frequency f. Through repetition of such adjustments, a value of switching frequency f at which the duty cycle is closest to 50% when the load current is maximum is determined. Thus, a value of switching frequency f at which the load current becomes maximum when input/output terminal voltage V2 has the above value is determined. Control circuit 47 stores this determined value of switching frequency f as a value of preset switching frequency fs.

Figure 7:
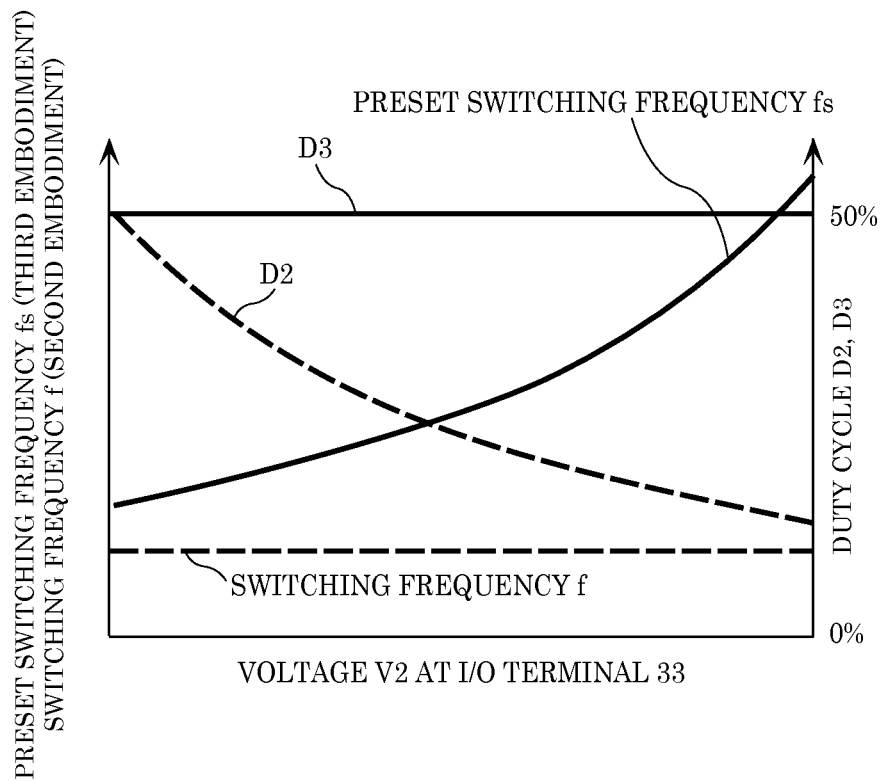
FIG. 7 is a diagram of correlation between a switching frequency and a duty cycle of the DC-to-DC converter according to the third embodiment.

Thus, for each of various values of voltage V2 at input/output terminal 33, a value of switching frequency f at which the duty cycle is closest to 50% when the load current becomes maximum is determined. From the obtained result, a correlation between these values of input/output terminal voltage V2 and values of preset switching frequency fs is determined. FIG. 7 is a diagram of correlation between preset switching frequency fs and the duty cycle. In FIG. 7, the horizontal axis represents voltage V2 at input/output terminal 33, the vertical axis on the left side represents preset switching frequency fs (the third embodiment) or switching frequency f (the second embodiment), and the vertical axis on the right side represents the duty cycle. In FIG. 7, DC-to-DC converter 11 according to the third embodiment has preset switching frequency fs and duty cycle D3, and DC-to-DC converter 11 according to the second embodiment has switching frequency f and duty cycle D2.

In FIG. 7, DC-to-DC converter 11 according to the second embodiment has constant switching frequency f regardless of a value of voltage V2 at input/output terminal 33 when voltage V2 at input/output terminal 33 is stepped down and output from input/output terminal 13. Control circuit 47 performs a step-down operation by changing duty cycle D2 so that duty cycle D2 is reduced as voltage V2 at input/output terminal 33 increases.

In DC-to-DC converter 11 according to the third embodiment, switching frequency f at which duty cycle D3 is closest to 50% when the load current is maximum is predetermined as preset switching frequency fs. Thus, as illustrated in FIG. 7, duty cycle D3 is constant around 50% independently of a value of voltage V2 at input/output terminal 33 when the load current is maximum, and preset switching frequency fs increases as voltage V2 at input/output terminal 33 increases.

Values of voltage V2 at input/output terminal 33 and their correlated values of preset switching frequency fs in the relationship illustrated in FIG. 7 are stored in a memory of control circuit 47. With this, when voltage V2 at input/output terminal 33 is stepped down and output from input/output terminal 13, control circuit 47 controls switching elements 37, 39, 41, and 43 as follows.

First, control circuit 47 reads voltage V2 at input/output terminal 33. Next, control circuit 47 determines a value of preset switching frequency fs that is correlated with the read value of voltage V2 at input/output terminal 33 with reference to the relationship of correlation between voltage V2 at input/output terminal 33 and preset switching frequency fs stored in the memory and illustrated in FIG. 7. Subsequently, control circuit 47 controls switching elements 37, 39, 41, and 43 at present switching frequency fs having the determined value.

Under this control, the duty cycle is closest to 50% even when the maximum load current flows from input/output terminal 13 to ground terminal 15, and therefore the risk of transformer current It becoming negative and flowing back is low. Furthermore, when current less than the maximum load current flows, the control is such that the duty cycle is reduced as the load current is reduced. In this case, transformer current It is also reduced, and therefore a backflow caused due to transformer current It being negative can be prevented, not leading to rapid loss in DC-to-DC converter 11, and thus it is possible to reduce a decrease in efficiency.

Figure 8:
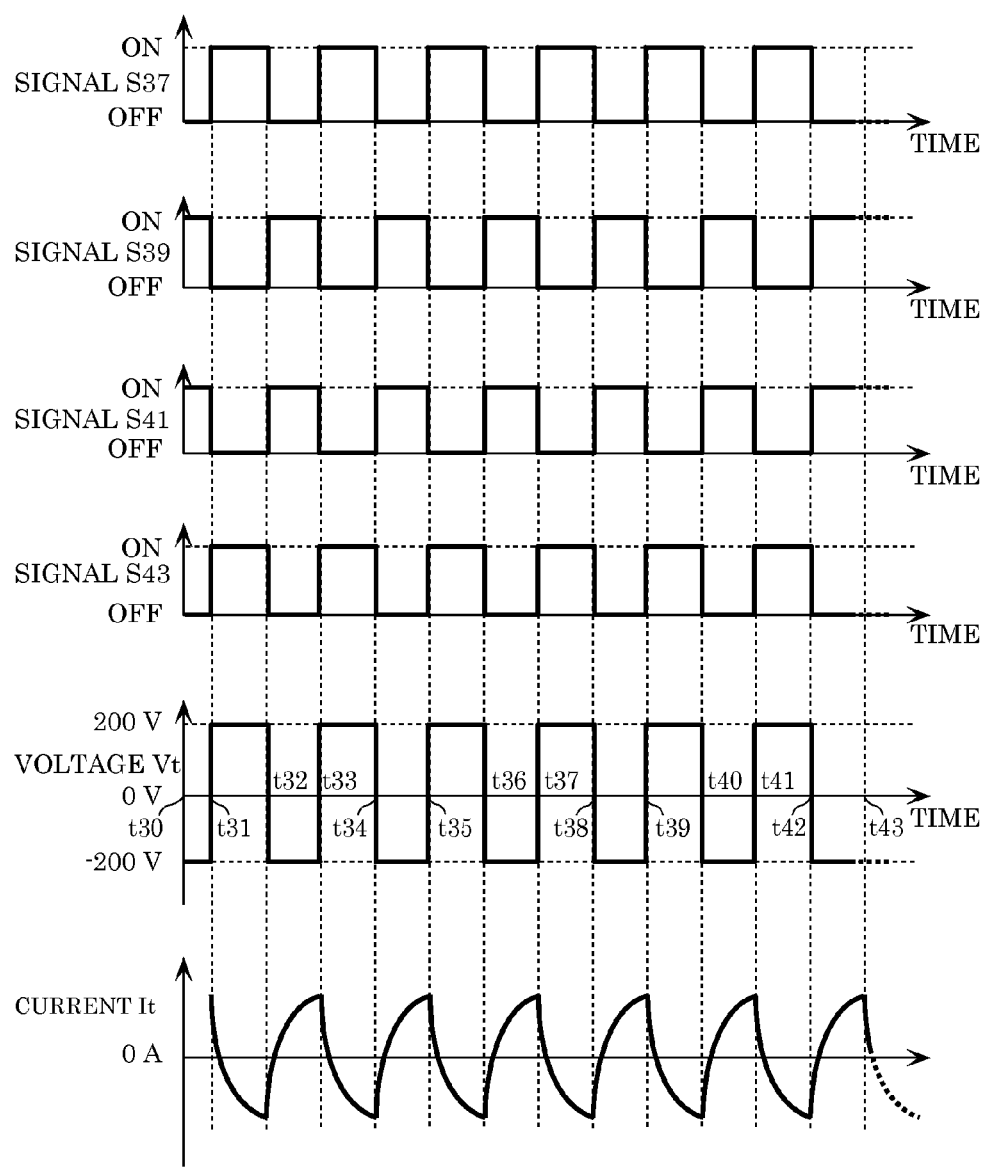
FIG. 8 illustrates waveforms of signals in the DC-to-DC converter according to the third embodiment.

FIG. 8 illustrates waveforms of signals of DC-to-DC converter 11 according to the third embodiment where the maximum load current flows from input/output terminal 13 to ground terminal 15 during the above-described operation. FIG. 8 illustrates a pulse waveform of signal S37 for switching switching element 37, a pulse waveform of signal S39 for switching switching element 39, a pulse waveform of signal S41 for switching switching element 41, a pulse waveform of signal S43 for switching switching element 43, voltage Vt of secondary winding 45 of transformer 29, and current It of the transformer. In FIG. 8, the horizontal axis represents time. In the operation illustrated in FIG. 8, preset switching frequency fs determined in correlation with voltage V2 at input/output terminal 33 based on FIG. 7 is twice switching frequency f used in the operation illustrated in FIG. 6.

Since the duty cycle is closest to 50% when the load current is maximum as described above, an ON period and OFF period of each of switching elements 37, 39, 41, and 43 are almost the same as illustrated in FIG. 8. As a result, transformer voltage Vt substantially changes within a range of −200 V to +200 V almost without a period in which transformer voltage Vt remains at 0 V as illustrated in FIG. 8. Consequently, there is almost no period for transformer current It to become negative while transformer voltage Vt is 0 V as illustrated in FIG. 8, and thus it is possible to reduce the risk of transformer current It becoming negative and flowing back even when the load current is maximum. Thus, DC-to-DC converter 11 with reduced loss can be provided.

Note that operations other than the operation described above are the same as those of DC-to-DC converter 11 according to the first and second embodiments. Therefore, DC-to-DC converter 11 is capable of bi-directional step-up and step-down operations while reducing loss attributed to a backflow of transformer current It.

With the above structure and operation, DC-to-DC converter 11 according to the third embodiment is capable of reducing the risk of transformer current It, which flows through secondary winding 45 of transformer 29, becoming negative even when the load current is maximum, and therefore there is no longer a need for control that increases transformer current It so that transformer current It does not become negative. As a result, a reactive current that is generated to increase transformer current It is no longer necessary, and the efficiency can be improved. Thus, it is possible to provide bi-directional DC-to-DC converter 11 capable of both step-up and step-down operations with high efficiency.

Note that voltage V1 at input/output terminal 13 is stepped up and output from input/output terminal 33 and voltage V2 at input/output terminal 33 is stepped down and output from input/output terminal 13 in the above-described operations of DC-to-DC converter 11 according to the first to third embodiments, but the voltage level relationship may be opposite. In this case, a high voltage is connected to input/output terminal 33 while a low voltage is connected to input/output terminal 13. For example, when DC 200 V of direct-current power supply 16 is stepped down so that battery 36, the full charge voltage of which is DC 100 V, is charged, current sensor 52 for detecting a charging current for battery 36 needs to be provided on a current path connected to ground terminal 15, rather than a current path connected to ground terminal 35.

Furthermore, control circuit 47 in DC-to-DC converter 11 according to the first embodiment adjusts the pulse waveforms upon a step-down operation by shifting the phases of signals for switching respective switching elements 37 and 41 from the phases of signals for switching respective switching elements 39 and 43, but it may also be possible to change the duty cycle at the same time as shifting the phase. In this case, control circuit 47 can roughly adjust a step-down ratio in the phase adjustment and in this state, make fine adjustment on the duty cycle to precisely adjust the step-down ratio, and thus it is possible to improve the accuracy of voltage V1 at input/output terminal 13.

Furthermore, the turns ratio which is a ratio of the number of winding turns between the primary winding and the secondary winding of transformer 29 is 1:1 in DC-to-DC converter 11 according to the first to third embodiments, but other turns ratios may be used, and even when such turns ratios are used, the same or similar effects can be produced. In this case, however, the step-up or step-down ratio of DC-to-DC converter 11 also changes according to the turns ratio, and therefore it is necessary to adjust switching frequency f, the phase of each signal for switching, and the duty cycle.

Furthermore, resonant inductor 27 is connected in series to primary winding 31 of transformer 29 in DC-to-DC converter 11 according to the first to third embodiments, but resonant inductor 27 may be leakage inductance of transformer 29 instead of being a stand-alone inductor, and in this case, the same or similar effects can be produced.

In DC-to-DC converter 11 according to the first to third embodiments, magnetic-bias control capacitor 53 has a sufficiently large capacitance value so that the voltage variation of secondary winding 45 is small when current flows through secondary winding 45 of transformer 29. When magnetic-bias control capacitor 53 has a small capacitance value and is connected in series to resonant capacitor 25 via transformer 29, magnetic-bias control capacitor 53 can function as a resonant capacitor. This is effective in that it is possible to adjust an output voltage by changing pulse waveforms, although the output voltage is high in this case as compared to the case where magnetic-bias control capacitor 53 has a large capacitance value.

Furthermore, DC-to-DC converter 11 according to the first to third embodiments includes magnetic-bias control capacitor 53, but adjusting pulse waveforms so as to eliminate magnetic bias of transformer 29 under control makes magnetic-bias control capacitor 53 no longer necessary. Even with such a structure, it is possible to adjust the output voltage by changing the pulse waveforms as in the first to third embodiments.

INDUSTRIAL APPLICABILITY

The DC-to-DC converter according to the present invention is capable of bi-directional, both step-up and step-down operations and is therefore useful particularly as, for example, a DC-to-DC converter for charging and discharging a battery.

REFERENCE MARKS IN THE DRAWINGS

11 DC-to-DC converter
13 input/output terminal (first input/output terminal)
15 ground terminal (first ground terminal)
17 switching element (first switching element)
19 switching element (second switching element)
21 switching element (third switching element)
23 switching element (fourth switching element)
25 resonant capacitor
27 resonant inductor
29 transformer
31 primary winding
33 input/output terminal (second input/output terminal)
35 ground terminal (second ground terminal)
37 switching element (fifth switching element)
39 switching element (sixth switching element)
41 switching element (seventh switching element)
43 switching element (eighth switching element)
45 secondary winding
47 control circuit

The invention claimed is:
1. A DC-to-DC converter comprising:
a first input/output terminal;
a first ground terminal;

a first switching element connected in series between the first input/output terminal and the first ground terminal;
a second switching element connected between the first input/output terminal and the first ground terminal, the second switching element being connected in series to the first switching element at a first connection point;
a third switching element connected in series between the first input/output terminal and the first ground terminal;
a fourth switching element connected between the first input/output terminal and the first ground terminal, the fourth switching element being connected in series to the third switching element at a second connection point;
a resonant capacitor connected in series between the first connection point and the second connection point;
a resonant inductor connected between the first connection point and the second connection point, the resonant inductor being connected in series to the resonant capacitor;
a second input/output terminal;
a second ground terminal;
a fifth switching element connected in series between the second input/output terminal and the second ground terminal;
a sixth switching element connected between the second input/output terminal and the second ground terminal, the sixth switching element being connected in series to the fifth switching element at a third connection point;
a seventh switching element connected in series between the second input/output terminal and the second ground terminal;
an eighth switching element connected between the second input/output terminal and the second ground terminal, the eighth switching element being connected in series to the seventh switching element at a fourth connection point;
a transformer having
a primary winding connected between the first connection point and the second connection point, the primary winding being connected in series to the resonant capacitor and the resonant inductor, and
a secondary winding connected in series between the third connection point and the fourth connection point; and
a control circuit electrically connected to the first switching element, the second switching element, the third switching element, the fourth switching element, the fifth switching element, the sixth switching element, the seventh switching element, and the eighth switching element,
wherein the control circuit is operable to:
adjust a switching frequency of the first switching element, the second switching element, the third switching element, and the fourth switching element when voltage at the first input/output terminal is stepped up and output from the second input/output terminal; and
adjust pulse waveforms for switching the fifth switching element, the sixth switching element, the seventh switching element, and the eighth switching element by shifting switching phases of the seventh switching element and the eighth switching element from switching phases of the fifth switching element and the sixth switching element when voltage at the second input/output terminal is stepped down and output from the first input/output terminal.

2. The DC-to-DC converter according to claim 1, wherein the control circuit is operable to adjust the pulse waveforms without adjusting a switching frequency for switching the fifth switching element, the sixth switching element the seventh switching element, and the eighth switching element when the voltage at the second input/output terminal is stepped down and output from the first input/output terminal.

3. The DC-to-DC converter according to claim 1, wherein the resonant inductor is leakage inductance of the transformer.

4. The DC-to-DC converter according to claim 1, wherein the control circuit is operable to adjust the switching frequency of the first switching element, the second switching element, the third switching element, and the fourth switching element, to make the switching frequency higher than or equal to a resonant frequency of a resonant circuit formed of the resonant capacitor, the resonant inductor, and the primary winding.

5. The DC-to-DC converter according to claim 1, wherein a switching frequency of the fifth switching element, the sixth switching element, the seventh switching element, and the eighth switching element is higher than a resonant frequency of a resonant circuit formed of the resonant capacitor, the resonant inductor, and the primary winding.

6. The DC-to-DC converter according to claim 1, wherein a preset switching frequency is predetermined in correlation with a value of the voltage at the second input/output terminal, the preset switching frequency being a switching frequency at which a duty cycle is closest to a predetermined value where a maximum load current flows to the first input/output terminal when the voltage at the second input/output terminal is stepped down and output from the first input/output terminal, and
the control circuit is operable to set the preset switching frequency according to the voltage at the second input/output terminal when the voltage at the second input/output terminal is stepped down and output from the first input/output terminal.

7. The DC-to-DC converter according to claim 6, wherein the predetermined value of the duty cycle is 50%.

8. A DC-to-DC converter comprising:
a first input/output terminal;
a first ground terminal;
a first switching element connected in series between the first input/output terminal and the first ground terminal;
a second switching element connected between the first input/output terminal and the first ground terminal, the second switching element being connected in series to the first switching element at a first connection point;
a third switching element connected in series between the first input/output terminal and the first ground terminal;
a fourth switching element connected between the first input/output terminal and the first ground terminal, the fourth switching element being connected in series to the third switching element at a second connection point;
a resonant capacitor connected in series between the first connection point and the second connection point;
a resonant inductor connected between the first connection point and the second connection point, the resonant inductor being connected in series to the resonant capacitor;
a second input/output terminal;
a second ground terminal;

a fifth switching element connected in series between the second input/output terminal and the second ground terminal;

a sixth switching element connected between the second input/output terminal and the second ground terminal, the sixth switching element being connected in series to the fifth switching element at a third connection point;

a seventh switching element connected in series between the second input/output terminal and the second ground terminal;

an eighth switching element connected between the second input/output terminal and the second ground terminal, the eighth switching element being connected in series to the seventh switching element at a fourth connection point;

a transformer having
    a primary winding connected between the first connection point and the second connection point, the primary winding being connected in series to the resonant capacitor and the resonant inductor, and
    a secondary winding connected in series between the third connection point and the fourth connection point; and a control circuit electrically connected to the first switching element, the second switching element, the third switching element, the fourth switching element, the fifth switching element, the sixth switching element, the seventh switching element, and the eighth switching element, wherein the control circuit is operable to:
    adjust a switching frequency of the first switching element, the second switching element, the third switching element, and the fourth switching element when voltage at the first input/output terminal is stepped up and output from the second input/output terminal; and
    adjust pulse waveforms for switching the fifth switching element, the sixth switching element, the seventh switching element, and the eighth switching element by adjusting a duty cycle with switching phases of the seventh switching element and the eighth switching element shifted 180 degrees from switching phases of the fifth switching element and the sixth switching element when voltage at the second input/output terminal is stepped down and output from the first input/output terminal.

9. The DC-to-DC converter according to claim 8,
wherein the control circuit is operable to adjust the pulse waveforms without adjusting a switching frequency for switching the fifth switching element, the sixth switching element, the seventh switching element, and the eighth switching element when the voltage at the second input/output terminal is stepped down and output from the first input/output terminal.

10. The DC-to-DC converter according to claim 8,
wherein the resonant inductor is leakage inductance of the transformer.

11. The DC-to-DC converter according to claim 8,
wherein the control circuit is operable to adjust the switching frequency of the first switching element, the second switching element, the third switching element, and the fourth switching element, to make the switching frequency higher than or equal to a resonant frequency of a resonant circuit formed of the resonant capacitor, the resonant inductor, and the primary winding.

12. The DC-to-DC converter according to claim 8,
wherein a switching frequency of the fifth switching element, the sixth switching element, the seventh switching element, and the eighth switching element is higher than a resonant frequency of a resonant circuit formed of the resonant capacitor, the resonant inductor, and the primary winding.

13. The DC-to-DC converter according to claim 8,
wherein a preset switching frequency is predetermined in correlation with a value of the voltage at the second input/output terminal, the preset switching frequency being a switching frequency at which a duty cycle is closest to a predetermined value where a maximum load current flows to the first input/output terminal when the voltage at the second input/output terminal is stepped down and output from the first input/output terminal, and the control circuit is operable to set the preset switching frequency according to the voltage at the second input/output terminal when the voltage at the second input/output terminal is stepped down and output from the first input/output terminal.

14. The DC-to-DC converter according to claim 13,
wherein the predetermined value of the duty cycle is 50%.

* * * * *